United States Patent
Pereira et al.

(10) Patent No.: US 7,560,004 B2
(45) Date of Patent: *Jul. 14, 2009

(54) ADHESIVE AND SEALING LAYERS FOR ELECTROPHORETIC DISPLAYS

(75) Inventors: Cheri Pereira, Fremont, CA (US); Jack Hou, Fremont, CA (US); Rong-Chang Liang, Cupertino, CA (US)

(73) Assignee: Sipix Imaging, Inc., Fremont, CA (US)

( * ) Notice: Subject to any disclaimer, the term of this patent is extended or adjusted under 35 U.S.C. 154(b) by 310 days.

This patent is subject to a terminal disclaimer.

(21) Appl. No.: 10/651,540

(22) Filed: Aug. 29, 2003

(65) Prior Publication Data

US 2004/0112525 A1 Jun. 17, 2004

Related U.S. Application Data (60) Provisional application No. 60/408,256, filed on Sep. 4, 2002.

(51) Int. Cl.
  *B29C 65/48* (2006.01)
  *G02F 1/167* (2006.01)
(52) U.S. Cl. .................. 156/145; 156/331.7
(58) Field of Classification Search ........... 156/292, 156/325, 145, 146, 278, 290, 331.7; 359/296; 525/457
See application file for complete search history.

(56) References Cited

U.S. PATENT DOCUMENTS

| | | |
|---|---|---|
| 3,281,426 A | 10/1966 | Van Dyke Tiers |
| 3,612,758 A | 10/1971 | Evans |
| 3,958,199 A | 5/1976 | Berger et al. |
| 3,979,212 A | 9/1976 | Peters et al. |
| 4,135,789 A | 1/1979 | Hall |
| 4,192,762 A | 3/1980 | Osborn |
| 4,680,103 A * | 7/1987 | Beilin et al. ............. 359/296 |
| 4,985,535 A * | 1/1991 | Takada et al. ............. 528/272 |
| 5,071,909 A | 12/1991 | Pappin et al. |
| 5,248,752 A * | 9/1993 | Argyropoulos et al. ....... 528/49 |
| 5,288,797 A * | 2/1994 | Khalil et al. ............. 524/872 |
| 5,326,846 A | 7/1994 | Nagai et al. |
| 5,334,690 A * | 8/1994 | Schafheutle et al. ......... 528/71 |
| 5,360,873 A | 11/1994 | Saito et al. |
| 5,410,011 A * | 4/1995 | Konishi et al. ............ 528/73 |
| 5,462,797 A | 10/1995 | Williams et al. |

(Continued)

FOREIGN PATENT DOCUMENTS

EP 0 305 175 3/1989

(Continued)

OTHER PUBLICATIONS

Engineeringtalk (Huntsman polyurethanes), pp. 1-2, copy right 2000-2005.*

(Continued)

*Primary Examiner*—Richard Crispino
*Assistant Examiner*—Michael A Tolin
(74) *Attorney, Agent, or Firm*—Howrey LLP (57) ABSTRACT

The invention is directed to methods and compositions for improving the adhesion properties and switching performance of an electrophoretic display. The methods and compositions comprise the use of a high dielectric polymer or oligomer and optionally a crosslinking agent.

14 Claims, 1 Drawing Sheet

The display cell prepared by the Microcup technology.

U.S. PATENT DOCUMENTS

| | | | |
|---|---|---|---|
| 5,490,893 | A | 2/1996 | Enlow et al. |
| 5,659,408 | A * | 8/1997 | Wenyon ............... 359/15 |
| 5,698,656 | A * | 12/1997 | Ohashi et al. ............ 528/49 |
| 5,827,926 | A | 10/1998 | Shimizu |
| 5,837,766 | A | 11/1998 | Metro et al. |
| 5,908,899 | A | 6/1999 | Tahara et al. |
| 5,930,026 | A | 7/1999 | Jacobson et al. |
| 5,942,330 | A | 8/1999 | Kelley |
| 5,943,113 | A | 8/1999 | Ichihashi |
| 5,961,804 | A | 10/1999 | Jacobson et al. |
| 6,067,135 | A | 5/2000 | Shimizu et al. |
| 6,083,630 | A * | 7/2000 | Robe ............... 428/481 |
| 6,092,392 | A | 7/2000 | Verlinden et al. |
| 6,118,502 | A | 9/2000 | Yamazaki et al. |
| 6,239,896 | B1 * | 5/2001 | Ikeda ............... 359/240 |
| 6,254,751 | B1 | 7/2001 | Reiter et al. |
| 6,300,932 | B1 | 10/2001 | Albert |
| 6,327,072 | B1 | 12/2001 | Comiskey et al. |
| 6,353,078 | B1 * | 3/2002 | Murata et al. ............ 528/83 |
| 6,452,038 | B1 * | 9/2002 | Rao et al. ............ 560/115 |
| 6,512,626 | B1 | 1/2003 | Schmidt |
| 6,540,384 | B1 | 4/2003 | Rosevear |
| 6,545,797 | B2 | 4/2003 | Chen et al. |
| 6,574,034 | B1 | 6/2003 | Lin et al. |
| 6,672,921 | B1 | 1/2004 | Liang et al. |
| 6,741,386 | B2 | 5/2004 | Minami |
| 6,750,844 | B2 | 6/2004 | Nakanishi |
| 6,753,067 | B2 | 6/2004 | Chen et al. |
| 6,795,138 | B2 | 9/2004 | Liang et al. |
| 6,816,146 | B2 | 11/2004 | Harada et al. |
| 6,831,769 | B2 * | 12/2004 | Holman et al. ............ 359/296 |
| 6,930,818 | B1 | 8/2005 | Liang et al. |
| 6,933,098 | B2 | 8/2005 | Chan-Park et al. |
| 6,982,178 | B2 | 1/2006 | LeCain et al. |
| 7,005,488 | B2 | 2/2006 | Smillie |
| 7,166,182 | B2 | 1/2007 | Pereira et al. |
| 6,864,875 | B2 | 3/2008 | Drzaic et al. |
| 2001/0003755 | A1 | 6/2001 | Fiori et al. |
| 2002/0008898 | A1 | 1/2002 | Katase |
| 2002/0075556 | A1 * | 6/2002 | Liang et al. ............ 359/296 |
| 2002/0131147 | A1 | 9/2002 | Paolini et al. |
| 2002/0188053 | A1 | 12/2002 | Zang et al. |
| 2004/0085619 | A1 | 5/2004 | Wu et al. |
| 2004/0112525 | A1 | 6/2004 | Pereira et al. |
| 2004/0120024 | A1 | 6/2004 | Chen et al. |
| 2004/0170776 | A1 | 9/2004 | Liang et al. |
| 2004/0219306 | A1 | 11/2004 | Wang et al. |
| 2005/0035941 | A1 * | 2/2005 | Albert et al. ............ 345/107 |
| 2007/0035497 | A1 | 2/2007 | Chen et al. |
| 2007/0036919 | A1 | 2/2007 | Wang et al. |

FOREIGN PATENT DOCUMENTS

| | | |
|---|---|---|
| EP | 1 013 690 | 6/2002 |
| JP | 57174367 A * | 10/1982 |
| WO | WO 02/65215 | 2/2001 |
| WO | WO 01/67170 | 9/2001 |
| WO | WO 0167170 A1 * | 9/2001 |
| WO | WO 02/01281 | 1/2002 |

OTHER PUBLICATIONS

Chen, S.M. (Jul. 2003) The Applications for the Revolutionary Electronic Paper Technology. *OPTO News & Letters*, 102, 37-41. (in Chinese, English abstract attached, full translation available upon request).

Chen, S.M. (May 2003) The New Applications and the Dynamics of Companies. *TRI*. 1-10. (In Chinese, English abstract attached, full translation available upon request).

Hopper and Novotny, (1979) An Electrophoretic Display, its Proterties, Mocel, and Addressing. *IEEE Trans. Electr. Dev.*, 26(8) : 1148-1152.

Int'l Search Report (PCT/US03/27301) Jan. 2004 PCT.

Ku and Liepins, (1987) *Electrical Properties of Polymers*. Hanser Pulisher (1993 version is not available).

Lee, H., & Liang, R.C. (Jun. 2003) SiPix Microcup(R) Electronic Paper—An Introduction. *Advanced Display*, Issue 37, 4-9 (in Chinese, English abstract attached, full translation available upon request).

Liang, R.C. (Feb. 2003) *Microcup(R) Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.

Liang, R.C., Hou, J., Chung, J., Wang, X., Pereira, C., & Chen, Y. (2003). Microcup(R) Active and Passive Matrix Electrophoretic Displays by A Roll-to-Roll Manufacturing Processes. *SID Digest*, 20.1.

Liang, R.C., Hou, J., & Zang, H.M. (Dec. 2002) Microcup Electrophoretic Displays by Roll-to-Roll Manufacturing Processes. *IDW*, EP2-2, 1337-1340.

Liang, R.C., Hou, J., Zang, H.M., Chung, J., & Tseng, S. (2003). Microcup(R) displays : Electronic Paper by Roll-to-Roll Manufacturing Processes. *Journal of the SID*, 11(4), 621-628.

Liang, R.C., Hou, J., Zang, H.M., & Chung, J. (Feb. 2003). *Passive Matrix Microcup(R) Electrophoretic Displays*. Paper presented at the IDMC, Taipei, Taiwan.

Liang, R.C., & Tseng, S. (Feb. 2003). *Microcup(R) LCD, An New Type of Dispersed LCD by A Roll-to-Roll Manufacturing Process*. Paper presented at the IDMC, Taipei, Taiwan.

Nikkei Microdevices. (Dec. 2002) Newly-Developed Color Electronic Paper Promises—Unbeatable Production Efficiency. *Nikkei Microdevices*, 3. (in Japanese, with English translation).

Zang, H.M., & Liang, R.C. (2003) Microcup Electronic Paper by Roll-to-Roll Manufacturing Processes. *The Spectrum*, 16(2), 16-21.

Engineeringtalk (Huntsman polyurethanes), *Thermoplastic Polyurethanes Meet Diverse Needs*, pp. 1-2, copy rihgt 2000-2005, http://www.engineeringtalk.com/news/hus/hus100.html downloaded Apr. 25, 2006.

Alliger, G. and Sjothun, I.J., << Vulcanization of Elastomers >>, 1978, Robert E. Krieger Publishing Co.

Bayer Material Science Product Data Sheets: Desmodur Z 4470 BA (p. 1), Nov. 3, 2005.

Bayer Material Science Product Data Sheets: Desmodur Z 4470 SN (p. 1), Nov. 3, 2005.

Blow, C.M. and Hepburn, C., << Rubber Technology and Manufacture >> 1982, Butterworth Scientific.

Brydson, J.A., editor, << Robber Chemistry >>, 1978, Applied Science Publishers.

Hartshorn, S.R., editor, << Structural Adhesives, Chemistry and Technology >>, 1986, Plenum Press.

Lee, H. and Neville, K., << Handbook of Epoxy Resins >>, 1967, McGrow-Hill.

Walker, B.M., editor, "Handbook of Thermoplastic Elastomers", 1979, Van Nostrand Reinhold Co.

* cited by examiner

Figure 1: The display cell prepared by the Microcup technology.

ADHESIVE AND SEALING LAYERS FOR ELECTROPHORETIC DISPLAYS

CROSS REFERENCE TO RELATED APPLICATION

This application claims the benefit of U.S. Provisional Patent Application No. 60/408,256, filed on Sep. 4, 2002, which is incorporated herein in its entirety.

BACKGROUND OF THE INVENTION

1. Field of the Invention

The invention is directed to methods and compositions for improving the adhesion properties and switching performance of electrophoretic displays, particularly at low operation voltages.

2. Description of Related Art

The electrophoretic display (EPD) is a non-emissive device based on the electrophoresis phenomenon of charged pigment particles suspended in a solvent. It was first proposed in 1969. The display usually comprises two plates with electrodes placed opposing each other, separated by spacers. One of the electrodes is usually transparent. An electrophoretic fluid composed of a colored solvent with charged pigment particles dispersed therein is enclosed between the two plates. When a voltage difference is imposed between the two electrodes, the pigment particles migrate to one side or the other causing either the color of the pigment particles or the color of the solvent being seen from the viewing side.

There are several different types of EPDs. In the partition type EPD (see M. A. Hopper and V. Novotny, IEEE Trans. Electr. Dev., 26(8):1148-1152 (1979)), there are partitions between the two electrodes for dividing the space into smaller cells in order to prevent undesired movement of particles, such as sedimentation. The microcapsule type EPD (as described in U.S. Pat. Nos. 5,961,804 and 5,930,026) has a substantially two dimensional arrangement of microcapsules each having therein an electrophoretic composition of a dielectric fluid and a suspension of charged pigment particles that visually contrast with the dielectric solvent. Another type of EPD (see U.S. Pat. No. 3,612,758) has electrophoretic cells that are formed from parallel line reservoirs. The channel-like electrophoretic cells are covered with, and in electrical contact with, transparent conductors. A layer of transparent glass from which side the panel is viewed overlies the transparent conductors.

The latest improvement to EPD technology involves the use of microcup technology. The microcup technology is a significant advance in EPD display technology, allowing for roll to roll manufacturing.

Figure 1:
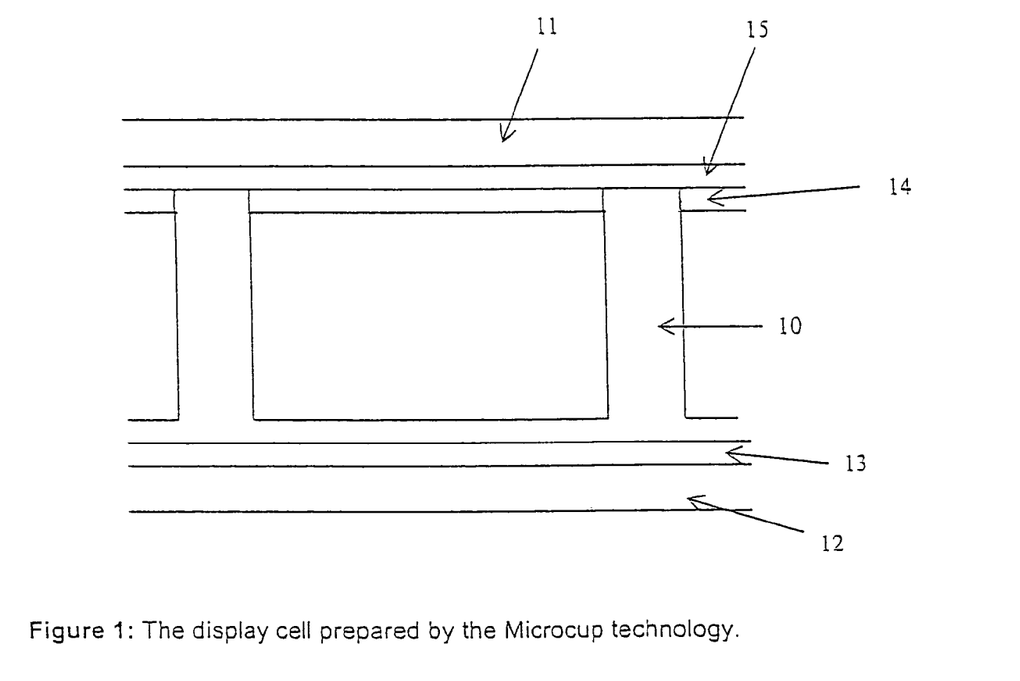
FIG. 1 depicts a typically display cell prepared by the microcup technology.

Although EPD technology has advanced, its performance, however, can be further improved. In a co-pending application, U.S. Ser. No. 10/618,257 filed on Jul. 10, 2003, the content of which is incorporated herein by reference in its entirety, methods are disclosed for improving display performance. However, when a high absorbance dye or pigment is incorporated into the adhesive layer (15) and carbon black in the sealing layer (14), the display is limited to be viewed from the side of the second electrode (12 as shown in FIG. 1) because the opaque color of the sealing and adhesive layers from the dye and carbon black makes viewing from the side of the first electrode (11 as shown in FIG. 1) difficult.

Another area for improvement in known EPD devices lie in the adhesives currently used. Typical examples of the lamination adhesives include acrylic and rubber types of pressure sensitive adhesives (such as DURO-TAK 80-1105), hot melt adhesives (such as EVA, polyester or polyamide types), UV adhesives (based on multifunctional acrylates, vinylethers or epoxides) and thermal or moisture cured adhesives (such as epoxy resins, polyurethanes, vinyl esters or rubbers). Most of these conventional adhesives exhibit a strong capacitor effect that often causes inferior EPD switching performance. The use of a hydrophilic adhesive or addition of a conductive additive in the adhesive may alleviate the problems associated with the strong capacitor effect. However, these possible remedies may result in setbacks such as sensitivity to humidity and undesirable current leakage or short circuitry.

SUMMARY OF THE INVENTION

The present invention provides solutions for at least some of the drawbacks discussed above. Specifically, some embodiments of the present invention provide EPD devices with improved performance. It has been found that certain high dielectric polymers and oligomers are especially effective in improving the adhesion properties and switching performance of an electrophoretic display. The present invention also describes ways to provide improved adhesives for use with EPD devices or other displays. Although the present invention is discussed in the context of EPD devices, it should be understood that some features may be applicable to other display technologies. At least some of these and other objectives described herein will be met by embodiments of the present invention.

A first aspect of the invention is directed to the use of a high dielectric polymer or oligomer for improving the adhesion properties and switching performance of an electrophoretic display.

A second aspect of the invention is directed to a method for improving adhesion properties and switching performance of an electrophoretic display which method comprises applying an adhesive solution comprising a high dielectric polymer or oligomer and optionally a crosslinking agent, to at least one of the components in the display for adhesion.

A third aspect of the invention is directed to an adhesive composition comprising a high dielectric polymer or oligomer and optionally a crosslinking agent. The composition may further comprise a catalyst for the crosslinking reaction.

A fourth aspect of the invention is directed to a method for improving adhesion properties and switching performance of an electrophoretic display which method comprises sealing the display cells with a sealing composition comprising a high dielectric polymer or oligomer and optionally a crosslinking agent.

A fifth aspect of the invention is directed to a sealing composition comprising a high dielectric polymer or oligomer and optionally a crosslinking agent. The composition may further comprise a catalyst for the crosslinking action.

In one embodiment, the polymers and oligomers of the invention preferably have a dielectric constant higher than that of the solvent used in the electrophoretic fluid. It is preferably in the range of about 3.5-17, more preferably about 6-15. Among them, polyurethanes, polyureas, polycarbonates, polyamides, polyesters, polycaprolactones, polyvinyl alcohols, polyethers, polyvinyl acetate derivatives, polyvinyl fluorides, polyvinylidene fluorides, polyvinyl butyrals, polyvinylpyrrolidones, poly(2-ethyl-2-oxazoline)s, high-acid-number acrylic or methacrylic polymers or copolymers, cellulose derivatives, gum Arabic, alginate, lecithin and polymers derived from amino acids are preferred. Suitable cellulose derivatives include hydroxyethyl cellulose, propyl cellulose, cellulose acetate propionate, cellulose acetate butyrate and the like.

The polymers and oligomers may have functional groups for chain extension or crosslinking during or after lamination.

The adhesive and sealing layers prepared from the compositions of the invention not only have shown good adhesive properties and high film strength, they also exhibit unique low temperature flexibility and adjustable mechanical properties under a broad range of environmental conditions.

Moreover, because of their good adhesion properties to the electrode layer, the use of a sealing layer prepared from the sealing composition of the invention eliminates or alleviates the need of a separate adhesive layer for lamination of the electrode layer to the sealed microcups. As a result, the total thickness of the insulating layer between the electrophoretic fluid and the electrode plate is reduced which results in enhanced switching performance even at a reduced driving voltage.

In addition in some embodiments, because no carbon black or high absorbance dyes or pigments are needed in the sealing and adhesive layers, any possible current leakage or short circuit due to the carbon black or dyes is eliminated. This is an especially advantageous feature for high-resolution passive and active matrix display applications. Without the carbon black or dyes, the clear sealing layer allows the display to be viewed from either side of the display which results in greater process latitude.

A sixth aspect of the invention is directed to an electrophoretic display comprising an adhesive layer and/or a sealing layer of the invention.

It should be understood, of course, that the improvements used herein may be adapted for use with microcup technology. Improved EPD technology can be found in co-pending applications, U.S. Ser. No. 09/518,488 filed on Mar. 3, 2000 (WO 01/67170), U.S. Ser. No. 09/606,654 filed on Jun. 28, 2000 (WO 02/01281) and U.S. Ser. No. 09/784,972 filed on Feb. 15, 2001 (WO 02/65215), all of which are incorporated herein by reference. Displays prepared from the microcup technology represent a significant advancement in the field of display technology.

While the methods and compositions of the invention provide significant improvement in the adhesion properties and display performance, they also provide significant improvement in the manufacturing process.

DETAILED DESCRIPTION OF THE INVENTION

I. DEFINITIONS

Unless defined otherwise in this specification, all technical terms are used herein according to their conventional definitions as they are commonly used and understood by those of ordinary skill in the art. Tradenames are identified for materials used and their sources are also given.

The term "Dmax" refers to the maximum achievable optical density of the display.

The term "Dmin" refers to the minimum optical density of the display background.

The term "contrast ratio" is defined as the ratio of the % reflectance of an electrophoretic display at the Dmax state to the % reflectance of the display at the Dmin state.

II. MICROCUP TECHNOLOGY

One embodiment of a microcup based display cell is shown in FIG. 1. The cell (10) is sandwiched between a first electrode layer (11) and a second electrode layer (12). A primer layer (13) is optionally present between the cell (10) and the second electrode layer (12). The cell (10) is filled with an electrophoretic fluid and sealed with a sealing layer (14). The first electrode layer (11) is laminated onto the sealed cell, optionally with an adhesive layer.

The display panel may be prepared by microembossing or photolithography as disclosed in WO 01/67170. In the microembossing process, an embossable composition is coated onto the conductor side of the second electrode layer (12) and embossed under pressure to produce the microcup array. To improve the mold release property and the adhesion between the sealed microcups and the electrode layer, the latter may be pretreated with a thin primer layer (13) before being coated with the embossable composition.

The embossable composition may comprise a thermoplastic, thermoset or a precursor thereof which may be selected from a group consisting of multifunctional acrylates or methacrylates, vinylbezenes, vinylethers, epoxides, oligomers or polymers thereof, and the like. Multifunctional acrylates and oligomers thereof are the most preferred. A combination of a multifunctional epoxide and a multifunctional acrylate is also very useful to achieve desirable physico-mechanical properties. A crosslinkable oligomer imparting flexibility, such as urethane acrylate or polyester acrylate, is usually also added to improve the flexure resistance of the embossed microcups. The composition may contain an oligomer, a monomer, additives and optionally also a polymer. The glass transition temperature (Tg) for the embossable composition usually ranges from about −70° C. to about 150° C., preferably from about −45° C. to about 50° C.

The microembossing process is typically carried out at a temperature higher than the Tg. A heated male mold or a heated housing substrate against which the mold presses may be used to control the microembossing temperature and pressure.

The mold is released during or after the embossable composition is hardened to reveal an array of microcups (10). The hardening of the embossable composition may be accomplished by cooling, solvent evaporation, cross-linking by radiation, heat or moisture. If the curing of the embossable composition is accomplished by UV radiation, UV may radiate onto the embossable composition through the transparent conductor layer. Alternatively, UV lamps may be placed inside the mold. In this case, the mold must be transparent to allow the UV light to radiate through the pre-patterned male mold on to the thermoset precursor layer.

A thin primer layer (13) is optionally precoated onto the conductor layer to improve the release properties of the mold. The composition of the primer layer may be the same or different from the embossing composition.

In general, the dimension of each individual cells may be in the range of about $10^2$ to about $10^6$ $\mu m^2$, preferably from about $10^3$ to about $5\times10^4$ $\mu m^2$. The depth of the cells is in the range of about 3 to about 100 microns, preferably from about 10 to about 50 microns. The ratio between the area of opening to the total area is in the range from about 0.05 to about 0.95, preferably from about 0.4 to about 0.9. The width of the openings usually is in the range of about 15 to about 500 microns, preferably from about 25 to about 300 microns, from edge to edge of the openings.

The microcups are filled with an electrophoretic fluid and sealed as disclosed in WO 01/67170. The sealing of the microcups may be accomplished in a number of ways. For example, it may be accomplished by overcoating the filled microcups with a sealing composition comprising a solvent and a sealing material selected from the group consisting of thermoplastic elastomers, polyvalent acrylates or methacrylates, cyanoacrylates, polyvalent vinyls including vinylbenzenes, vinylsilanes and vinylethers, polyvalent epoxides, polyvalent isocyanates, polyvalent allyls and other oligomers or polymers containing crosslinkable functional groups. Additives such as polymeric binder or thickener, photoinitiator, catalyst, filler, colorant or surfactant may be added to the sealing composition to improve the physico-mechanical and optical properties of the display. The sealing composition is essentially incompatible with the electrophoretic fluid and has a specific gravity lower than that of the electrophoretic fluid. Upon solvent evaporation, the sealing composition forms a conforming seamless seal on top of the filled microcups. The sealing layer may be further hardened by heat, radiation, e-beam or other curing methods. Sealing with a composition comprising a thermoplastic elastomer is particularly preferred. Examples of thermoplastic elastomers include tri-block or di-block copolymers of styrene and isoprene, butadiene or ethylene/butylene, such as the Kraton™ D and G series from Kraton Polymer Company. Crystalline rubbers such as poly(ethylene-co-propylene-co-5-methylene-2-norbornene) and other EPDM (Ethylene Propylene Diene Rubber terpolymer) from Exxon Mobil have also been found very useful.

Alternatively, the sealing composition may be dispersed into an electrophoretic fluid and filled into the microcups. The sealing composition is essentially incompatible with the electrophoretic fluid and is lighter than the electrophoretic fluid. Upon phase separation and solvent evaporation, the sealing composition floats to the top of the filled microcups and forms a seamless sealing layer thereon. The sealing layer may be further hardened by heat, radiation or other curing methods.

The sealed microcups finally are laminated with the first electrode layer (11) optionally pre-coated with an adhesive layer (15).

III. POLYMERS AND OLIGOMERS USEFUL FOR THE PRESENT INVENTION

The polymers and oligomers useful for the present invention have a dielectric constant higher than that of the dielectric solvent used in the electrophoretic fluid. However, polymers having a very high dielectric constant tend to be hydrophilic and may result in poor environmental stability particularly under high humidity conditions. For optimum performance, the dielectric constant of the polymers or oligomers for this invention is preferably in the range of about 3.5-17, more preferably 6-15. Among them, the colorless and transparent polymers are the most preferred.

Examples include polyurethanes, polyureas, polycarbonates, polyamides, polyesters, polycaprolactones, polyvinyl alcohols, polyethers, polyvinyl acetate derivatives [such as poly(ethylene-co-vinylacetate)], polyvinyl fluorides, polyvinylidene fluorides, polyvinyl butyrals, polyvinylpyrrolidones, poly(2-ethyl-2-oxazoline)s, high-acid-number acrylic or methacrylic polymers or copolymers, cellulose derivatives, gum Arabic, alginate, lecithin and polymers derived from amino acids. Suitable cellulose derivatives include hydroxyethyl cellulose, propyl cellulose, cellulose acetate propionate, cellulose acetate butyrate and the like.

The polymers and oligomers preferably have functional groups for chain extension or crosslinking during or after lamination.

Among the polymers and oligomers mentioned above, polyurethanes, polyureas, polycarbonates, polyesters and polyamides, especially those having functional groups are particularly preferred because of their superior adhesion and optical properties and high environmental resistance.

Examples for the functional groups include, but are not limited to, —OH, —SH, —NCO, —NCS, —NHR, —NRCONHR, —NRCSNHR, vinyl, epoxide and derivatives thereof, including cyclic derivatives. The "R" mentioned above may be hydrogen, alkyl, aryl, alkylaryl or arylalkyl of up to 20 carbon atoms. The alkyl, aryl, alkylaryl or arylalkyl may also optionally comprise N, O, S or halogen. Preferred "R"s include hydrogen, methyl, ethyl, phenyl, hydroxymethyl, hydroxyethyl or hydroxybutyl.

Functionalized polyurethanes, such as hydroxyl terminated polyester polyurethanes or polyether polyurethanes, isocyanate terminated polyester polyurethanes or polyether polyurethanes, and acrylate terminated polyester polyurethanes, or polyether polyurethanes are particularly preferred.

The polyester polyols or polyether polyols used for the synthesis of polyester polyurethanes or polyether polyurethanes include, but are not limited to, polycaprolactone, polyesters (derived from, for example, adipic acid, phthalate anhydride or maleic anhydride), polyethylene glycol and its copolymers and polypropylene glycol and its copolymers. Among the polyester polyurethanes, the hydroxyl terminated polyester polyurethanes, such as those from the IROSTIC series (by Huntsman Polyurethanes) are some of the most preferred. Tables of dielectric constants of typical commercially available polymers can be found in literature such as "Electrical Properties of Polymers", by C. C. Ku and R. Liepins; Hanser Publishers, 1993; and "Prediction of Polymer Properties" $3^{rd}$. ed., by J. Bicerano; Marcel Dekker, Inc., 2002. Some of them are listed in Table 1 below:

TABLE 1

Dielectric Constants of Polymers (from "Electrical Properties of Polymers", by C. C. Ku and R. Liepins, Hanser Publishers, 1993)

| Polymers | $\epsilon$ | Temperature (° C.) | Frequency (Hz) |
|---|---|---|---|
| Polyvinyl alcohol/acetate), 0-1.5% acetate (Elvannol 50A-42) | 10.4 | 25 | $10^3$ |
| Polyether polyurethane (based on polyethylene oxide 600) | 10 | 18 | 10 |
| Polyurethane Elastomers | 4.7-9.53 | 25 | 60 |
| Polyfumaronitrile | 8.5 | 26 | $10^3$ |
| Poly (vinyl fluoride) | 8.5 | 25 | $10^3$ |
| Poly (vinylidene fluoride) | 8.4 | 25 | $10^3$ |
| Melamine/formaldehyde resin | 7.9 | 25 | 60 |
| Cellulose nitrate | 7.0-7.5 | 25 | 60 |
| Polysulfide | 7.3 | 25 | 60 |
| Phenol/aniline/formaldehyde (Bakelite BT-48-306) | 7.15 | 24 | $10^3$ |
| Chlorosulfonated polyethylene | 7.0 | 25 | 60 |
| Melamine/phenol resin | 7.0 | 25 | 60 |
| Methyl cellulose (Methocel) | 6.8 | 22 | $10^3$ |
| Poly (urea/formaldehyde) | 6.7 | 24 | $10^3$ |
| Cellulose acetate butyrate | 3.2-6.2 | 25 | $10^3$ |
| Cellulose acetate propionate | 3.2-6.2 | 25 | $10^6$ |
| Phenol/aniline/formaldehyde (Durite No. 221X) | 5.70 | 24 | 60 |
| Phenol/aniline/formaldehyde | 4.50 | 25 | $10^3$ |
| Cellulose triacetate | 3.2-4.5 | 25 | $10^3$ |
| Epoxy, standard (Bisphenol A) | 4.02 | 25 | 60 |
| Poly(methyl methacrylate)/polyvinyl chloride)alloy | 4.0 | 25 | 60 |
| Nylon 66 | 4.0 | 25 | 60 |
| Nylon 6/12 | 4.0 | 25 | 60 |
| Allyl diglycol carbonate | 2.0-3.9 | 25 | $10^4$ |
| Acetal(polyoxymethylene), Delrin | 3.7 | 25 | 60 |
| Nylon 6 | 3.7 | 25 | |
| Aniline-formaldehyde (Dilectene 100) | 3.68 | 25 | $10^3$ |
| Aromatic polyester-imides | 3.50 | 25 | $10^3$ |
| Aromatic polyimides | 3.5 | 25 | $10^3$ |
| Acrylonitril-Butadiene-Styrene(ABS) | 2.5-3.5 | 25 | 60 |

TABLE 1-continued

Dielectric Constants of Polymers (from "Electrical Properties of Polymers", by C. C. Ku and R. Liepins, Hanser Publishers, 1993)

| Polymers | ε | Temperature (° C.) | Frequency (Hz) |
|---|---|---|---|
| Aromatic polyamideimides | 3.32 | 25 | $10^3$ |
| Poly (butadiene) | 3.3 | 25 | $10^6$ |
| Cellulose, regenerated (cellophane) | 3.2 | 25 | $10^3$ |
| Cellulose propionate | 3.2 | 25 | $10^6$ |
| Cycloaliphatic epoxy resin | 3.2 | 25 | 60 |
| Poly(ethylene terephthalate), thermoplastic | 3.2 | 25 | $10^3$ |
| Poly(butyl terephthalate) | 3.2 | 25 | 100 |
| Ethylene/vinyl acetate copolymer | 3.16 | 25 | 60 |
| Aromatic polyethers | 3.14 | 25 | 60 |
| Aromatic polysulfone | 3.13 | 23 | $10^3$ |
| Poly (methyl methacrylate), Plexiglas | 3.12 | 27 | $10^3$ |
| Ethyl cellulose, Ethocel LT-5 | 3.09 | 25 | $10^3$ |
| Poly (vinyl chloride), chlorinated | 3.08 | 25 | 60 |
| Poly (vinyl acetate) Elvacet 42A-900) | 3.07 | 25 | $10^3$ |
| Polysiloxane resin (methyl, phenyl, and methylphenyl) | 3.04 | 25 | $10^3$ |
| Poly(styrene/acrylonitrile) (SAN) | 2.6-3.0 | 25 | $10^4$ |
| Polycarbonate | 2.99 | 25 | $10^3$ |
| Methyl and methylphenyl polysiloxane (DC 550) | 2.90 | 20 | $10^3$ |
| Poly(ethyl methacrylate) | 2.75 | 22 | $10^3$ |
| Poly (methyl methacrylate) | 2.68 | 25 | $10^3$ |
| Poly(butyl methacrylate) | 2.62 | 24 | 100 |
| Poly(2,6-dimethyl-1,4-phenylene ether) | 2.6 | 25 | $10^3$ |
| Fluorinated ethylene/propylene copolymer (FEP) | 2.0-2.5 | 25 | $10^3$ |
| SBR (75% butadiene) | 2.5 | 26 | $10^3$ |
| Polystyrene | 2.4 | 25 | $10^3$ |
| Poly(98-99% isobutylene/1-2% isoprene) (GR-I; butyl rubber) | 2.38 | 25 | $10^3$ |
| Polyethylene, ultra high MW | 2.3 | 25 | $10^3$ |
| Polyethylene, medium density | 2.2 | 25 | $10^3$ |
| Polytetrafluoroethylene | 2.0 | 25 | $10^3$ |

IV. THE METHODS AND COMPOSITIONS OF THE INVENTION

The adhesive solution and sealing composition of the invention comprise a high dielectric polymer or oligomer as described above and optionally a crosslinking agent.

Suitable crosslinking agents for hydroxy-terminated or amino-terminated high dielectric polymers include multifunctional isocyanates or isothiocyanates, multifunctional epoxides, polyaziridines, among which aliphatic polyisocyanates (e.g., Desmodur N-100 from Bayer and Irodur E-358 from Huntsman Polyurethane) and polyaziridine are the most preferred.

When a hydroxyl terminated polyester polyurethane is used as the high dielectric polymer and a polyisocyanate is used as the crosslinking agent in the composition, the molar ratio of the hydroxyl group of the hydroxyl terminated polyester polyurethane to the isocyanate group of the polyisocyanate is preferably about 1/10 to 10/1, more preferably about 1.1/1 to 2/1.

While a crosslinking agent is present, a catalyst may also be added to promote the crosslinking reaction. Suitable catalysts include, but are not limited to, organotin catalysts (e.g., dibutyl tin dilaurate, DBTDL), organozirconium catalysts (e.g., zirconium chelate 2,4-pentanedione, K-KAT XC-4205 and K-KAT XC-6212 from King Industry), bismuth catalysts (e.g., K-KAT 348 also from King Industry), with organotin and organozirconium catalysts being the most preferred.

Suitable crosslinking agents for multifunctional isocyanate-terminated high dielectric polymers include multifunctional alcohols and amines such as butanediol, pentanediol, glycerol, triethanolamine, N,N, N',N'-tetrakis(2-hydroxyethyl)ethylene diamine, ethylene diamine, diethylene triamine, Jeffamine, polyimine and derivatives thereof.

The adhesive solution and sealing composition may be prepared by dissolving or dispersing an appropriate amount of the high dielectric polymer or oligomer in a solvent or solvent mixture. The concentration of the polymer or oligomer is preferably in the range of about 20-99.5% by weight, more preferably in the range of about 50-95% by weight.

Suitable solvents include ketones such as methyl ethyl ketone (MEK), methyl isobutyl ketone (MIBK), cyclohexanone or acetone; esters such as butyl acetate, isopropyl acetate or ethyl acetate; ethers such as tetrahydrofuran (THF), 1,2-diethoxy ethane or a mixture thereof.

The solution is subject to thorough mixing followed by degassing before use.

A crosslinking agent and optionally about 0.1-1% by weight of a catalyst based on total solid weight may be added to the adhesive solution or the sealing composition.

If the composition is used as an adhesive, the solution is coated onto the electrode layer (11 in FIG. 1). The coated electrode layer is then laminated over the sealed microcups and the resultant assembly is finally post cured as described below. In this case, the display cells are pre-sealed with a conventional sealing layer.

If the composition is used as a sealing composition, the solution is coated onto microcups pre-filled with an electrophoretic fluid. In this case, the sealing layer may also serve as an adhesive layer, which means that the electrode layer (11 in FIG. 1) may be pressed directly onto the sealing layer with the ITO side facing the sealing layer, without the need of a separate adhesive layer.

The post-curing of the assemblies comprising the adhesive or sealing layer of the invention may be carried out at a temperature in the range of about 50-100° C. for about 0.5 to 2 hours followed by additional heating at 40-80° C. for 6-24 hours to ensure completion of the crosslinking of the polymers.

V. EXAMPLES

The following examples are given to enable those skilled in the art to more clearly understand and to practice the present invention. They should not be considered as limiting the scope of the invention, but merely as being illustrative and representative thereof.

Glossary

| Acronym | Full Name | Description |
|---|---|---|
| HPU-20 | IROSTIC P 9820-20 | Hydroxyl terminated polyester polyurethane, Huntsman Polyurethane, Viscosity 1800-2200 mPs |

-continued

| Acronym | Full Name | Description |
|---|---|---|
| | | at 20° C. |
| HPU-18 | IROSTIC P 9820-18 | Hydroxyl terminated polyester polyurethane, Huntsman Polyurethane, Viscosity 1600-2000 mPs at 20° C. |
| HPU-12 | IROSTIC P 9820-12 | Hydroxyl terminated polyester polyurethane, Huntsman Polyurethane, Viscosity 1000-1400 mPs at 20° C. |
| PSA | DURO-TAK 80-1105 | Pressure sensitive adhesives, National Starch and Chemical Company |
| IE-359 | IRODUR E 359 | polyisocyanate, 20% of ethyl acetate solution, NCO content: 6.1%, Huntsman Polyurethane, |
| DN-100 | DESMODUR N-100 | HDI, aliphatic poly triisocyanate, NCO content: 22.1-22% Bayer. |
| KK-348 | K-KAT348 | Bismium carboxylate 2-ethylhexane acid, King Industry |
| KFG190x | Kraton$^{tm}$ FG190x | Thermoplastic rubber containing maleic anhydride functionalized triblock copolymer consisting of polystyrene end blocks and poly ethylene/butylene middle blocks. Shell Elastomer LLC. |
| KG1650 | Kraton ™ G1650 | Thermoplastic rubber containing triblock copolymer consisting of polystyrene end blocks and poly ethylene/butylene middle blocks. Shell Elastomer LLC. |
| KRPG6919 | Kraton ™ RPG6919 | Thermoplastic rubber containing hydrogenated (branch polyisoprene chains) block copolymer consisting of polystyrene end blocks and poly ethylene/butylenes middle blocks. Shell Elastomer LLC. |
| AP LHT-240 | Arcol Polyol LHT-240i | Tri-functional polyether polyols, Bayer |
| DBTDL | Dibutyltin Dilaurate | Tin catalyst, Aldrich |
| DZ4470 | Desmodur Z4470 | Di-functional aliphatic polyisocyanate, Bayer |
| VXC72 | Vulcan ™ XC2 | Conductive carbon black particles (particle size ~30 nm) from Cabot Corp., |
| SL7500 | Silwet L7500 | Polyalkyleneoxide modified polydimethylsiloxane. wetting agents, OSI specialties. |
| | BYK142 | Carbon black dispersion agents, BYK-Chemie |
| CAPA 6806 | CAPA 6806 | Hydroxyl terminated polycaprolactones, Tri-Iso Company |
| Isopar E | Isopar E | Solvent, ExxonMobil |

Preparation 1

Synthesis of a Reactive Protective Colloid $R_f$-amine 17.8 Gm of Krytox® methyl ester (DuPont, MW=1780, g=10) was dissolved in a solvent mixture containing 12 gm of 1,1,2-trichlorotrifluoroethane (Aldrich) and 1.5 gm of α,α,α-trifluorotoluene (Aldrich). The resultant solution was added drop by drop into a solution containing 7.3 gm of tris(2-aminoethyl)amine (Aldrich) in 25 gm of α,α,α-trifluorotoluene and 30 gm of 1,1,2-trichlorotrifluoroethane over 2 hours with stirring at room temperature. The mixture was then stirred for another 8 hours to allow the reaction to complete. The IR spectrum of the crude product clearly indicated the disappearance of C=O vibration for methyl ester at 17180 cm$^{-1}$ and the appearance of C=O vibration for the amide product at 1695 cm$^{-1}$. Solvents were removed by rotary evaporation followed by vacuum stripping at 100° C. for 4-6 hours. The crude product was then dissolved in 50 ml of PFS2 solvent (perfluoropolyether from Solvay Solexis) and extracted with 20 ml of ethyl acetate three times, then dried to yield 17 gm of purified product ($R_f$-amine1900) which showed excellent solubility in HT200.

Other reactive $R_f$ amines having different molecular weights such as $R_f$-amine4900 (g=30), $R_f$-amine2000 (g=11), $R_f$-amine800 (g=4) and $R_f$-amine650 (g=3) were also synthesized according to the same procedure.

Preparation 2

Preparation of $TiO_2$-containing Microcapsules as the Electrophoretic Fluid

9.05 Gm of Desmodur® N3400 aliphatic polyisocyanate (from Bayer AG) and 0.49 gm of triethanolamine (99%, Dow) were dissolved in 3.79 gm of MEK. To the resultant solution, 13 gm of $TiO_2$ R706 (DuPont) was added and homogenized for 2 minutes with a rotor-stator homogenizer (IKA ULTRA- TURRAX T25, IKA WORKS) at ambient temperature. A solution containing 1.67 gm of 1,5-pentanediol (BASF), 1.35 gm of polypropylene oxide (mw=725 from Aldrich), 2.47 gm of MEK and 0.32 gm of a 2% dibutyltin dilaurate (Aldrich) solution in MEK was added and further homogenized for 2 minutes. In the final step, 0.9 gm of $R_f$-amine 4900 from Preparation 1 in 40.0 gm of HT-200 (Solvay Solexis) was added and homogenized for 2 minutes, followed by addition of additional 0.9 gm of $R_f$-amine 4900 in 33.0 gm of HT-200 and homogenization for 2 minutes. A microcapsule dispersion with low viscosity was obtained.

The microcapsule dispersion obtained was heated at 80° C. overnight and stirred under low shear to post-cure the particles. The resultant microcapsule dispersion was filtered through a 400-mesh (38 micrometer) screen and the solid content of the filtered dispersion was measured to be 29% by weight with an IR-200 Moisture Analyzer (Denver Instrument Company).

The average particle size of the filtered dispersion was measured with the Beckman Coulter LS230 Particle Analyzer to be about 2 µm.

An EPD fluid containing 1.3% by weight of $CuPc-C_8F_{17}$ (structure given below) and 6% by weight (dry weight) of the resultant $TiO_2$ microcapsule in HT-200 was filled into the microcups which were then sealed and sandwiched between two ITO/PET films according to the procedure described in Preparation 3.

Preparation 3A

Primer Coated Transparent Conductor Film

A primer coating solution containing 33.2 gm of EB 600™ (acrylated epoxy oligomer, UCB, Smyrna, Ga.), 16.12 gm of SR 399™ (pentafunctional monomer, Sartomer, Exton, Pa.), 16.12 gm of TMPTA (UCB, Smyrna, Ga.), 20.61 gm of HDODA (1,6-hexanediol diacrylate, UCB, Smyrna, Ga.), 2 gm of Irgacure™ 369 (2-benzyl-2-(dimethylamino)-1-[4-(4-morpholinyl)phenyl]-1-butanone, Ciba, Tarrytown, N.Y.), 0.1 gm of Irganox™ 1035 (thiodiethylene bis(3,5-di(tert)-butyl-4-hydroxyhydrocinnamate, Ciba), 44.35 gm of poly (ethyl methacrylate) (MW. 515,000, Aldrich, Milwaukee, Wis.) and 399.15 gm of MEK (methyl ethyl ketone) was mixed thoroughly and coated onto a 5 mil transparent conductor film (ITO/PET film, 5 mil OC50 from CPFilms, Martinsville, Va.) using a #4 drawdown bar. The coated ITO film was dried in an oven at 65° C. for 10 minutes, then exposed to 1.8 J/cm² of UV light under nitrogen using a UV conveyer (DDU, Los Angles, Calif.).

Preparation 3B

Preparation of Microcups

TABLE 2

| Microcup Composition | | |
|---|---|---|
| Component | Weight Part | Source |
| EB 600 | 33.15 | UCB |
| SR 399 | 32.24 | Sartomer |
| HDDA | 20.61 | UCB |
| EB1360 | 6.00 | UCB |
| Hycar X43 | 8.00 | BF Goodrich |
| Irgacure 369 | 0.20 | Ciba |
| ITX | 0.04 | Aldrich |
| Antioxidant Ir1035 | 0.10 | Ciba |

33.15 Gm of EB 600™ (UCB, Smyrna, Ga.), 32.24 gm of SR 399™ (Sartomer, Exton, Pa.), 6 gm of EB1360™ (silicone acrylate, UCB, Smyrna, Ga.), 8 gm of Hycar 1300×43 (reactive liquid polymer, Noveon Inc. Cleveland, Ohio), 0.2 gm of Irgacure™ 369 (Ciba, Tarrytown, N.Y.), 0.04 gm of ITX (Isopropyl-9H-thioxanthen-9-one, Aldrich, Milwaukee, Wis.), 0.1 gm of Irganox™ 1035 (Ciba, Tarrytown, N.Y.) and 20.61 gm of HDODA (1,6-hexanediol diacrylate, UCB, Smyrna, Ga.) were mixed thoroughly with a Stir-Pak mixer (Cole Parmer, Vernon, Ill.) at room temperature for about 1 hour and debubbled by a centrifuge at 2000 rpm for about 15 minutes.

The microcup composition was slowly coated onto a 4"×4" electroformed Ni male mold for an array of 72 µm (length)× 72 µm (width)×35 µm (depth)×13 µm (width of top surface of the partition wall between cups) microcups. A plastic blade was used to remove excess of fluid and gently squeeze it into "valleys" of the Ni mold. The coated Ni mold was heated in an oven at 65° C. for 5 minutes and laminated with the primer coated ITO/PET film prepared in Preparation 3A, with the primer layer facing the Ni mold using a GBC Eagle 35 laminator (GBC, Northbrook, Ill.) preset at a roller temperature of 100° C., lamination speed of 1 ft/min and the roll gap at "heavy gauge". A UV curing station with a UV intensity of 2.5 mJ/cm² was used to cure the panel for 5 seconds. The ITO/PET film was then peeled away from the Ni mold at a peeling angle of about 30 degree to give a 4"×4" microcup array on ITO/PET. An acceptable release of the microcup array from the mold was observed. The thus obtained microcup array was further post-cured with a UV conveyor curing system (DDU, Los Angles, Calif.) with a UV dosage of 1.7 J/cm².

Preparation 3C

Filling and Sealing with a Sealing Composition

1 Gm of an electrophoretic fluid containing 6% by weight (dry weight) of the $TiO_2$ microcapsules prepared according to Preparation 2 and 1.3% by weight of a perfluorinated Cu-phthalocyanine dye ($CuPc-C_8F_{17}$) in HT-200 (Solvay Solexis) was filled into the 4"×4" microcup array prepared from Preparation 3B using a #0 drawdown bar. The excess of fluid was scraped away by a rubber blade.

A sealing composition was then overcoated onto the filled microcups using a Universal Blade Applicator and dried at room temperature to form a seamless sealing layer of about 2-3 μm dry thickness with good uniformity. The sealing solution used is indicated in each example below.

Preparation 3D

Lamination of Electrode Layer

An adhesive solution was first coated onto the ITO side of a 5-mil ITO/PET film. The adhesive composition used is indicated in each example below. The coated film was then laminated over the sealed microcups by a laminator at 100° C. at a linear speed of 20 cm/min.

Alternatively, when the display cells are sealed with a sealing composition of the invention, the electrode layer may be laminated directly over the sealed microcups without a separate adhesive layer.

Examples 1-5

Microcup EPDs with Both Sealing and Adhesive Layers

Examples 1-5 demonstrate the adhesive layer of the present invention. All five examples used the same sealing composition which was prepared by dissolving 0.48 parts (by weight) of Kraton™ FG190x (from Shell, Tex.), 0.91 parts of Kraton™ RPG6919 (from Shell, Tex.), 8.19 parts of Kraton™ G1650 (from Shell Elastomer LLC, Tex.), 0.043 parts of BYK142 (from BYK-Chemie) and 0.18 parts of Silwet L7500 (from OSI Specialties) in 79.9 parts of Isopar E (from ExxonMobil) and 8.88 parts of isopropyl acetate (from Aldrich). To the resultant solution, 1.43 parts of carbon black, Vulcan™ XC72 (from Cabot Crop.), was added to the solution under mixing. Mixing was continued for 45 minutes at 10500 rpm. The final dispersion was filtered through a 20 μm filter and coated on the filled microcups as described in Preparation 3C.

Example 1

Comparative Example, Kraton Elastomer Sealing Layer and PSA Adhesive Layer

The ITO side of an ITO/PET conductor film (5 mil OC50 from CPFilms) was overcoated with a 14% by weight solution of a pressure sensitive adhesive (DRUO-TAK 80-1105, from National Starch and Chemical Company) in MEK by a drawdown bar (targeted coverage: 0.3 gm/ft$^2$). The adhesive coated ITO/PET layer was then laminated over the sealed microcups prepared from the procedure as described under the heading of Examples 1-5 above, with a GBC Eagle 35 laminator at 100° C. The lamination speed was set at 20 cm/min with a gap of 1/32". The laminated film was then baked in a 65° C. oven for 1 hour to remove the residue solvent.

The contrast ratio as defined above was measured using a GretagMacbeth™ Spectrolino spectrometer against a standard black background. The results are shown in Table 3.

Example 2

Kraton Elastomer Sealing Layer and PU Adhesive Layer

The same procedure for the preparation of the Comparative Example 1 was followed, except that the pressure sensitive adhesive (DRUO-TAK 80-1105, from National Starch and Chemical Company) was replaced with a 14% (by weight) solution of polyurethane IROSTIC P9820-20 (from Huntsman Polyurethanes) in MEK/ethyl acetate (at 92.5/7.5 ratio by weight). The contrast ratios of the display of Example 2 are shown in Table 3.

Example 3

Kraton Elastomer Sealing Layer and PU Adhesive Layer

The same composition and procedure for the preparation of Example 2 were followed, except that the 14% (by weight) solution of IROSTIC P9820-20 (from Huntsman) was replaced with a 14% (by weight) solution of IROSTIC P9820-18 (from Huntsman Polyurethanes). The contrast ratios of the display of Example 3 are also shown in Table 3.

Example 4

Kraton Elastomer Sealing Layer and PU Adhesive Layer with a Crosslinker

The same procedure for the preparation of the Comparative Example 1 was followed, except that the pressure sensitive adhesive solution was replaced with a solution containing 13.44% by weight of IROSTIC P9820-20 (from Huntsman Polyurethanes), 5.6% by weight of polyisocyanate DESMO-DUR N-100 (from Bayer) and 1% by weight of catalyst K-KAT348 (from King Industry) in MEK/ethyl acetate (at 92.5/7.5 ratio by weight). The contrast ratios of the display of Example 4 are shown in Table 3.

Example 5

Kraton Elastomer Sealing Layer and PU Adhesive Layer with a Crosslinker

The same composition and procedure for the preparation of the Example 4 were followed, except that the IROSTIC P9820-20 (from Huntsman Polyurethanes) was replaced with IROSTIC P9820-18 (from Huntsman Polyurethanes) of the same concentration. The contrast ratios of the display of Example 5 are shown in Table 3.

TABLE 3

Results of Examples 1-5

| | Contrast Ratio (10 V) | Contrast Ratio (20 V) | Contrast Ratio (30 V) | Contrast Ratio (40 V) |
|---|---|---|---|---|
| Example 1 PSA (Comparative) | 1.05 | 2.75 | 4.47 | 5.37 |
| Example 2 HPU-20 | 1.62 | 4.9 | 5.62 | 6.76 |
| Example 3 HPU-18 | 3.89 | 8.91 | 8.71 | 8.32 |
| Example 4 HPU-20/DN-100/KK348 | 1.45 | 4.17 | 5.5 | 6.76 |
| Example 5 HPU-18/DN-100/KK348 | 3.39 | 8.71 | 10.47 | 10.23 |

As can be seen from Table 3, the contrast ratios of the EPD were significantly improved when a high dielectric polyurethane adhesive was used as the lamination adhesive. The improvement is particularly significant at low operation voltages.

In addition, all the examples (2-5) using a polyurethane as the lamination adhesive showed significantly better adhesion properties than comparative example 1 in which a pressure sensitive adhesive was used. The physicomechanical properties of the adhesive layer and in some cases the contrast ratios may be further improved by crosslinking the adhesive layer using a polyisocyanate crosslinking agent, DESMODUR N-100.

Examples 6-9

Microcup EPDs without a Separate Adhesive Layer

Examples 6-9 illustrate the use of a polyurethane layer as both the sealing layer and the lamination adhesive.

A. Sealing Compositions

Sealing Composition S1 (HPU-20/DN-100/KK-348):

13.44 Parts by weight of IROSTIC P9820-20 (from Huntsman Polyurethanes), 79.97 parts of MEK, 6.40 parts of ethyl acetate and 0.56 parts of DESMODUR N-100 (from Bayer) were mixed thoroughly. To the resultant solution, 0.14 parts of K-KAT348 (from King Industry) was added. The mixture was degassed for about 1 minute in a sonic bath before use.

Sealing Composition S2 (HPU-20/polyisocyanate IE-359):

13.44 Parts by weight of IROSTIC P9820-20 (from Huntsman Polyurethanes) was thoroughly dissolved in 79.97 parts of MEK and 6.40 parts of ethyl acetate, after which 0.56 parts of IRODUR E 359 (from Huntsman Polyurethanes) was added. The resultant solution was degassed for about 1 minute in a sonic bath before use.

Sealing Composition S3 (HPU-12/polyisocyanate IE-359):

The same composition and procedure for the preparation of sealing solution S2 were followed, except that IROSTIC P9820-12 (from Huntsman Polyurethanes) was used to replace IROSTIC P9820-20 (from Huntsman Polyurethanes).

B. Preparation of Samples

Three test samples were prepared according to Preparations 3A-3D. However, the preparation of the samples did not involve the use of an adhesive layer.

After each of the sealing compositions, S1, S2 and S3, was overcoated onto the filled microcups by using a 6 mil doctor blade to form a sealing layer, the sealed microcups were then air-dried in a hood for 10 minutes and heated in an 80° C. oven for 1 minute before lamination. The lamination of the electrode layer over the sealed microcups was accomplished by laminating the ITO side of an ITO/PET film (5 mil) directly onto the sealing layer, followed by post curing at 80° C. for 60 minutes and continued post curing at 65° C. overnight.

For the purpose of comparison, a control sample (Comparative Example 9) was prepared using the two layer procedure as described in Example 1. In the control sample, sealing composition S-1 was used to seal the filled microcups and the pressure sensitive adhesive (15% solution of DURO-TAK 80-1105 from National Starch and Chemical Company in MEK) was used as the adhesive layer.

C. Test Results

The contrast ratios are summarized in Table 4 in which the thickness of the sealing layer in the single layer system (Examples 6-8) was controlled to be the same as the total thickness of the sealing and adhesive layers in the two layer system (comparative Example 9).

TABLE 4

Contrast Ratios of Example 6-9

| | Sealing layer | Adhesive | Contrast Ratio | | | | |
|---|---|---|---|---|---|---|---|
| | | | 10 V | 20 V | 30 V | 40 V | 50 V |
| Example 6 | S-1 | None | 2.29 | 11.00 | 11.00 | 11.20 | 11.20 |
| Example 7 | S-2 | None | 2.24 | 6.76 | 8.32 | 8.51 | 7.94 |
| Example 8 | S-3 | None | 2.04 | 7.08 | 8.91 | 9.33 | 9.77 |
| Comparative Example 9 | S-1 | PSA | 1.60 | 5.80 | 7.10 | 6.90 | — |

It can be seen from Table 4 that contrast ratios of EPDs sealed and laminated with one single layer of the present invention are superior over the control prepared from the dual layer system.

A thermoelectric module was used to control the operating temperature of the display for the temperature latitude study. For the measurement, the display was driven at ±20V and 0.2 Hz electrical square waveform, where incoming light from an optical fiber cable connected to a light source was illuminated on the display and the reflecting light was collected and converted into an electrical signal by a photo-electric detector and finally the display electro-optic response was recorded. It was observed that the single layer microcup EPDs (Examples 6-8) showed significantly wider operation temperature latitude than the two layer EPD (comparative Example 9) using a PSA as the lamination adhesive.

Example 10

The procedure of top-sealing and lamination of Examples 6-9 was followed, except that the top-sealing composition comprises 17.10 parts (dry) by weight of CAPA 6806 (received from Tri-Iso Company), 0.71 parts (dry) by weight of DESMODUR N-100 (from Bayer), and 0.17 parts by weight of catalyst K-KAT348 (from King Industry) solution was dissolved in 82 parts by weight of MEK.

The sample was subjected for continuous switching under an electric field of 1.5 volt/μm in a 50° C. and 80% relative humidity environmental condition. The contrast ratio of the sample was measured for each period of time to monitor the percentage of contrast ratio changes throughout the whole switching period. From the test results, almost no degradation in contrast ratio was observed after 24 hours of continuously switching.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. A method for improving the contrast ratio of an electrophoretic display, comprising:
   (a) filling display cells with an electrophoretic fluid comprising a first solvent,
   (b) forming a sealing layer on top of, and in contact with, the electrophoretic fluid by crosslinking functionalized polyurethane in the presence of a crosslinking agent, a second solvent and optionally a catalyst, wherein the functionalized polyurethane comprises an —OH functional group, said functionalized polyurethane has a dielectric constant higher than that of the first solvent, and said second solvent is selected from the group consisting of ketones, esters, ethers, and mixtures thereof.

2. The method of claim 1 wherein said functionalized polyurethane has a dielectric constant in the range of about 3.5-17 measured at 18-27° C. and at 60 Hz.

3. The method of claim 2 wherein said functionalized polyurethane has a dielectric constant in the range of about 6-15 measured at 18-27° C. and at 60 Hz.

4. The method of claim 1 wherein said functional group is for chain extension or crosslinking.

5. The method of claim 1 wherein said functionalized polyurethane is a hydroxyl terminated polyester polyurethane.

6. The method of claim 1 wherein said functionalized polyurethane is a hydroxyl terminated polyester polyurethane and said crosslinking agent is a polyisocyanate.

7. The method of claim 6 wherein the molar ratio of the hydroxyl group of the hydroxyl terminated polyester polyurethane to the isocyanate group of the polyisocyanate is about 1/10 to 10/1.

8. The method of claim 7 wherein the molar ratio is about 1.1/1 to 2/1.

9. The method of claim 1 wherein said catalyst is selected from the group consisting of organotin catalysts, organozirconium catalysts and bismuth catalysts.

10. The method of claim 9 wherein said organotin catalyst is dibutyltin dilaurate.

11. The method of claim 1 wherein said electrophoretic display is prepared by the microcup technology.

12. The method of claim 1 wherein said crosslinking agent is a multifunctional isocyanate.

13. The method of claim 12 wherein said multifunctional isocyanate is an aliphatic polyisocyanate.

14. The method of claim 1 wherein said functionalized polyurethane is a hydroxyl terminated polyester polyurethane or a hydroxyl terminated polyether polyurethane.

* * * * *